United States Patent
Sadagopan et al.

(10) Patent No.: US 7,158,922 B2
(45) Date of Patent: Jan. 2, 2007

(54) SYSTEM AND METHOD FOR PREDICTION OF PANEL PERFORMANCE UNDER LOCALIZED LOADING CONDITIONS

(75) Inventors: Sriram Sadagopan, Munster, IN (US); Oscar Lanzi, III, Chicago, IL (US)

(73) Assignee: Ispat Inland, Inc., East Chicago, IN (US)

( * ) Notice: Subject to any disclaimer, the term of this patent is extended or adjusted under 35 U.S.C. 154(b) by 738 days.

(21) Appl. No.: 10/374,027

(22) Filed: Feb. 25, 2003

(65) Prior Publication Data

US 2004/0172224 A1 Sep. 2, 2004

(51) Int. Cl.
*G06F 17/50* (2006.01)
*G06T 17/00* (2006.01)

(52) U.S. Cl. .................. 703/2; 703/5; 703/7; 345/427; 700/97

(58) Field of Classification Search .................. 703/2, 703/5, 7; 345/427; 700/97
See application file for complete search history.

(56) References Cited

U.S. PATENT DOCUMENTS

| | | | | |
|---|---|---|---|---|
| 5,278,953 A | * | 1/1994 | Saxon et al. | 715/839 |
| 5,546,314 A | * | 8/1996 | Brost et al. | 700/159 |
| 5,696,687 A | * | 12/1997 | DeMotte et al. | 700/114 |
| 2003/0063425 A1 | * | 4/2003 | Smith et al. | 361/139 |
| 2003/0222871 A1 | * | 12/2003 | Brombolich | 345/427 |

* cited by examiner

*Primary Examiner*—Thai Phan
(74) *Attorney, Agent, or Firm*—Baker & Daniels LLP (57) ABSTRACT

The present invention involves a method and apparatus to reliably determine dent resistance to localized loading, for example, denting of sheet panels of vehicle. The method and apparatus contain the following attributes: (i) an accurate Finite Element Model of the localized loading process; (ii) a statistically designed experimental approach incorporating the effects of panel geometry, thickness, mechanical behavior of the material, forming process and loading condition; and (iii) programmed regression models that outputs the performance under localized loading of the sheet metal panel with panel geometry, thickness of the sheet material, mechanical behavior of the material, behavior during the forming process and loading conditions as inputs.

20 Claims, 7 Drawing Sheets

Figure 3. The flow chart of FEA of Full Panel approach. (Prior Art)

Figure 4. The flow chart of Design Guidelines for Dent Resistance approach.

Figure 5. Comparison between testing, and predictive tools for 0.7mm BH210.

Figure 6. Comparison between testing, and predictive tools for 0.7mm BH250.

Figure 7. Comparison between physical testing and predictive tools for 0.7mm DP500.

SYSTEM AND METHOD FOR PREDICTION OF PANEL PERFORMANCE UNDER LOCALIZED LOADING CONDITIONS

FIELD OF THE INVENTION

This invention relates to development of predictive tools for dent resistance, namely, resistance to localized loading of sheet panels such as used in automobiles.

DESCRIPTION OF THE RELATED ART

One of the defects relating to automobile steel panel is called "dings and dents." It is a situation where one automobile's fender or body gets a dent after being hit by a regular "ding," such as shopping carts or doors opened from another automobile parked next to it. Although these dents usually do not cause safety concerns, they do, however, mar the outer appearance of the panel and may cause deterioration, thus reducing consumer satisfaction level.

One way to solve this "dings and dents" problem may be to simply increase the thickness of a sheet metal, but it will invariably increase the cost and weight of a vehicle. Optimum material thickness or gauge selection is a compromise between lower or higher weight, cost, dent resistance, stiffness and buckling. Further, the surface shape and angle of the sheet metal creates different susceptibility to dent resistance. For example, a larger area of flat surface may be more susceptible to dent than an angled or curved one. In addition to thickness, dent resistance depends on multiple factors, such as: panel geometry, curvature, mechanical behavior of the sheet metal, forming and manufacturing (stamping) processes and loading condition. The loading condition is generally the combination of tension, compression, bending and shear. Denting is one form of localized loading because the damaged or dented area is generally small and localized.

Thus, simply increasing the general thickness of the sheet metal will unnecessarily increase the weight and cost, and the increase weight reduces the fuel efficiency of the vehicle. Today, designers can no longer simply increase the thickness of sheet metal, namely, an increase in weight and mass of a component, to avoid dent problem. Dent resistance must be properly assessed as part of the design process. Therefore, determining for an optimum thickness for different areas of the sheet metal that will provide the necessary and best dent resistance under the regular "dings" is important to reduce the cost of the vehicle.

Building multiple phases of prototype and then denting them is no longer the best choice of automobile manufactures because such an iterative methodology is time consuming and it does not always achieve the best result and is certainly not cost effective.

As stated above, dent resistance is an important performance metric used by the automotive companies to select materials for exposed body panels such as doors, fenders, hoods, etc. Typically, dent resistance is evaluated by automotive and supplier companies to determine an optimum gauge and grade level that would meet platform specifications.

Traditionally, dent resistance has been evaluated by physical testing, where the panel is loaded with a 1" steel ball at different locations of the panel. A common measure of dent resistance is the load to cause a dent of depth 0.1 mm. Usually, dent evaluation is an iterative process and involves physical trials using at least 3 or 4 different materials. Evaluation for dent resistance is more of an afterthought and in many cases, the automotive companies, in response to field complaints and warranty costs implement expensive "fix-it" solutions such as Beta patches. For the majority of cases, dent evaluation is not part of the design cycle of exposed panels.

Therefore, what is needed is an improved system for designing automobile body panels with desired sheet metal characteristics.

SUMMARY OF THE INVENTION

The present invention provides an analytical method for the prediction of resistance to quasi-static localized loading of sheet panels using non-linear Finite Element Analysis ("FEA") to determine optimized sheet metal thickness for sheet panels.

FEA is a widely used numerical technique for predicting the behavior of complex physical systems, such as how a structural design will perform in an impact situation. For instance, FEA has been widely utilized in the automobile industry to predict how a vehicle would behave during a crash. FEA provides a simulated crash test that closely resembles a real road test but without the expensive cost.

In essence, FEA divides a complex structure into a number of finite pieces or elements to form a mesh. The elements are connected at numerous joints along a periphery, known as nodes. Nodes are typically assigned a specific density throughout the material depending on the anticipated stress levels of a certain area. Areas which will received large amounts of stress normally have higher node densities than those regions that receive little or no stress. A plurality of approximate equations describing the behavior of each element under different imposed conditions (e.g. boundary conditions, loading conditions, thickness and materials) are then individually calculated and combined to give a series of numerical equations describing the whole problem in question.

Normally, inputs to the FEA analysis include panel geometry, material properties, panel shape/size and press conditions. These inputs may be known quantities from existing materials, or estimated values based on the designer's experience. The outputs of FEA may predict likely levels and distribution of materials stress, strain, failure, loading, deflection, wrinkling tendency and other related parameters.

Thus, the use of FEA as a modeling tool for design can create a process which minimizes the time and cost required for completion of a system. By modeling systems with FEA, a design may be developed to meet the required specifications without the necessity of designing with unnecessary safety buffer for confidence in testing. In reality, to facilitate this process, a number of tests were performed to characterize engineering data for existing systems in a variety of conditions. These conditions usually include three-dimensional measurements of stress, strain, and deflection in vibration, dynamic loading, and shock environments. By incorporating these three-dimensional measurements into a database used as an input to FEA, the output conditions under test loading of design systems can be in close agreement with actual test subjects; therefore, the FEA characteristics have been found to match the finished product very closely.

The utilization of FEA as an analysis tool has proven to provide high quality parts for automobile design. Both developmental cost and time have been drastically decreased by the addition of FEA to the design process.

As stated above that although FEA has been widely utilized to predict how a vehicle would behave in a simulated crash test, FEA has not been utilized to predict how a vehicle sheet metal panel would behave during a localized loading condition, such as a "dings and dents" situation which is annoying to customers and needs to be resolved to increase customer satisfaction level.

Utilizing FEA predictive capability may help the manufacturer to make effective use of new generation high strength steel and new steel technologies in producing vehicle sheet metal panels. More importantly, it allows the manufacturer to optimize material use and go right up to presswork limits, balancing the demands of cost, weight and complexity without comprising dent resistance. By having the predictive model, a manufacturer may save time and money by choosing the best performance and most efficient design at the least expensive price. One predictive model known by the inventor is the "FEA of Full Panel" approach. This approach is based on the use of FEA in which a Computer Aided Design ("CAD") model of an exposed body panel is virtually dented at different locations.

In the present invention, non-linear FEA of the quasi-static or dynamic denting process forms the core of the above-described predictive tools. The approach comprising the present invention is the Design Guidelines for Dent Resistance ("Design Guidelines"). This approach is based on the use of a parametric study carried out in conjunction with a statistical Design of Experiments ("DOE") technique. The invention utilizes an experimental methodology that observes elements most predictive of denting. In utilizing the Design Guidelines, the panel radius of curvature, thickness, stretch and material grade were changed to determine regression equations that predict the dent resistance of some common exposed panel materials. This predictive approach can be used by automobile manufacturers to significantly decrease the time required for styling, designing, and process engineering for exposed panels.

The present invention provides an analytical method for the prediction of resistance to localized loading of sheet panels using an accurate Finite Element Model of the localized loading process. The method uses a statistical Design of Experiments technique incorporating the effects of panel geometry, thickness, mechanical behavior of the material, forming process and loading condition. Further, the invention uses a programmed regression model that outputs the performance under localized loading of the sheet metal panel with panel geometry, thickness of the sheet materials, mechanical behavior of the material, behavior during the forming process and loading process condition as inputs.

The present invention, in one form, relates to a method or an algorithm, and an apparatus of utilizing Finite Element Analysis methodology and a statistically designed experimental approach to simulate and predict dent resistance of vehicle panels such as fender and body panels by taking the effects of panel geometry, thickness, mechanical behavior of the material, forming process and loading condition into consideration.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions that follow are presented in part in terms of algorithms and symbolic representations of operations on signals within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein that form part of the present invention; the operations are machine operations. Useful machines for performing the operations of the present invention include general-purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals and results.

The present invention also relates to an apparatus for performing these operations. This apparatus may be specifically constructed for the required purposes or it may comprise a general-purpose computer as selectively activated or reconfigured by a computer program stored in the computer. The algorithm presented herein is not inherently related to any particular computer or other apparatus. In particular, various general-purpose machines may be used with programs written in accordance with the teachings herein, or it may prove more convenient to construct more specialized apparatus to perform the required method steps. The required structure for a variety of these machines will appear from the description below.

In particular, the present invention involves providing a method and apparatus to predict the resistance of sheet metal panel to localized loading condition by utilizing Finite Element Analysis methodology. The present invention takes into consideration the effects of panel geometry, thickness, mechanical behavior of the material, forming process and loading condition.

Two main approaches may be used to develop predictive tools for dent resistance: 1) the FEA of Full Panel approach, and 2) the present invention, also referred to as the Design Guidelines approach. While the present invention consists of the Design Guidelines approach, the FEA or Full Panel approach is used for the purpose of comparison. So that the present invention may be better understood, both approaches are hereinafter described.

1. Denting FEA of Closure Panels ("FEA of Closure Panels Approach" or "FEA of Full Panel Approach"): This approach considers the actual geometry of the panel (and the assemblies when available) for analysis. Dent resistance of a panel is also critically dependent on the strains in the panel. The strain in the panel is imparted during the manufacturing (stamping) process with the amount of strain being directly related to the amount of dent resistance. Since it is also necessary to predict the strains imparted on the panel during forming, typically formability FEA analysis is required, in which the process of stamping the panel is simulated. "Formability" is the term generally used to evaluate the capacity of a material to withstand the stretch stresses of forming before splitting occurs. FEA is used to identify potential areas for stamping defects such as wrinkling, insufficient stretching, splitting, etc. After the stamping process, the surface of the panel to be virtually indented is meshed with finite elements using a commercially available "preprocessor," e.g., HyperMesh® (HyperMesh® is a registered trademark of Altair Computing, Inc. of Troy, Mich.). The localized loading is carried out by virtually denting the panel using a 1" spherical indenter using FEA and determining the dent depth after the load is removed. Although this is not as time consuming as physical trials, it may take up to 2 weeks to evaluate four to five different combinations of material thickness and steel grades for a given outer panel geometry.

2. Design Guidelines for Dent Resistance ("Design Guidelines Approach"): The Design Guidelines Approach predicts dent resistance that can be used by stylists and release engineers in the automotive industry to obtain a good estimate of dent resistance without resorting to the more comprehensive and time-consuming FEA approach as outlined above. In this approach, body panels are approximated by doubly curved plates of dimensions 300 mm×450 mm. Since body panels could have any curvature, many different curved plates of different combinations of curvatures were created (total of 21 curved plates). These curved plates were meshed with finite elements using a commercially available "preprocessor," e.g., HyperMesh®.

In contrast to the FEA of Full Panel Approach outlined in the paragraph above where the stamping process is simulated, in this method a statistical Design of Experiments approach ("DOE") is used to input the thickness of the sheet metal and the strain imparted during manufacturing. These plates are then virtually dented using FEA using a 1" spherical indenter and the dent depth determined after load removal. These analyses are carried out for different steel grades, and from the results, regression equations were developed. These equations are then programmed to output the dent depth at any applied load for a panel. This model requires the panel curvature, strains imparted during forming, thickness of the sheet metal, steel grade, and applied load as inputs. The output is the dent depth at the applied load. In contrast to the FEA of Full Panel Approach, the Design Guidelines Approach of the present invention is simple, very efficient, and takes a small fraction of the time it takes using the FEA of Full Panel Approach to yield accurate predictions of dent resistance.

A further description of these two approaches is given below. Since both of these methods use FEA, the general FEA technique used to predict quasi-static dent resistance is described first. After the description of these tools, results from a case study are presented which results from physical testing as compared with FEA of Full Panel Approach and Design Guidelines Approach predictions. The FEA results show very good overall agreement with physical test results. Finally a discussion on possible approaches to use these tools and resulting potential cost savings is presented.

Finite Element Modeling of Quasi-Static Denting

Components of denting FEA of the present invention are now explained herein. As described above, FEA divides a complex structure into a number of finite pieces or elements to form a mesh. In the present invention, a very fine mesh is used at the location of denting. For example, the largest element length may be set at about 0.7 mm to define the node being analyzed. In one embodiment of the present invention, triangular elements are utilized at the dent location.

Another component of the present invention simulates loading and unloading behaviors. A plurality of approximate equations describing the behavior of each element under different imposed conditions (e.g. boundary conditions, loading conditions, thickness and materials) are individually calculated and combined to give a series of numerical equations describing the whole problem in question. In one form of the present invention, quasi-static loading conditions are used; however, the invention is easily modifiable to use dynamic loading conditions. The present invention also applies a single loading-unloading cycle or an incremental loading-unloading cycle as outlined in the A/SP procedure for dent testing ("A/SP Guideline") ("Standardized Dent Test Procedure Manual", January 2001, Auto/Steel Partnership, Southfield, Mich., U.S.A.).

While any non-linear FEA software may be used to implement the present invention, the present invention has used MARC and ABAQUS®. MARC is manufactured by MSC.Software Corporation of Santa Ana, Calif. ABAQUS® is a registered trademark of and manufactured by Hibbitt, Karlsson & Sorensen, Inc. or Pawtucket, R.I. Two more components of the FEA denting of the present invention include consideration of mechanical behavior by using stress strain data generated by tensile testing and consideration of increase in the strength of the steel after the stamping process.

Approaches For Prediction of Dent Resistance

FEA of Full Panel Approach

The features of this procedure are described below:

Conduct formability FEA analysis, either one-step or incremental formability FEA analysis to determine stretch in the part. A one-step analysis is very useful in the initial stages of product development, where information on manufacturing feasibility is required. Typically, one-step FEA is conducted to give some direction on the shape and sized of the initial blank for the part and possible binder configurations. Incremental FEA is used when the initial blank configuration and binder information is known and more details with respect to process details are required. In most cases, stretch information in large features (as in the exposed surface of the part) obtained used one-step FEA is sufficiently accurate for further performance analysis. A formability FEA analysis is used by a manufacturer to simulate the stamping process to determine whether the manufacturer can manufacture the panel. For example, where the stretch is measured using defined regions, e.g. 100 mm circles, this is used instead of forming FEA.

Divide the panel into regions of equal stretch and thinning. This is based on the results from forming FEA.

Adjust the incoming material properties according to the amount of strain in the part to account for increase in steel strength.

Apply appropriate boundary conditions on the panel. If CAD files are available for support constraints, for example one or more of the inner panel, door beam, and mounting hardware, these can be used to set up constraints in the model. If these are not available, the constraints are approximated by applying fixed boundary conditions on the periphery of the part and the location of the door beam.

Apply the methodology for conducting denting FEA as described in the section above.

An important consideration is that with this approach, the accuracy of denting FEA is as good as the accuracy of stretch prediction.

Design Guidelines for Dent Resistance Approach

Figure 1:
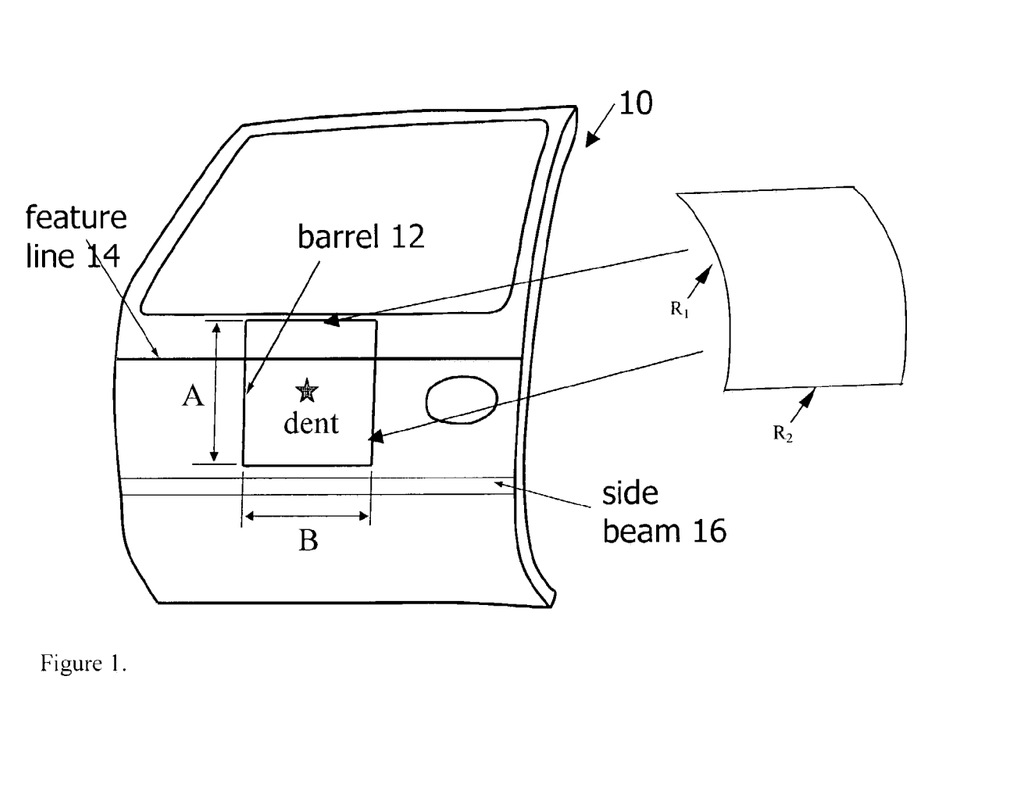
FIG. 1 is a generic door and the barrel approximation for the Design Guidelines approach.
Figure 2:
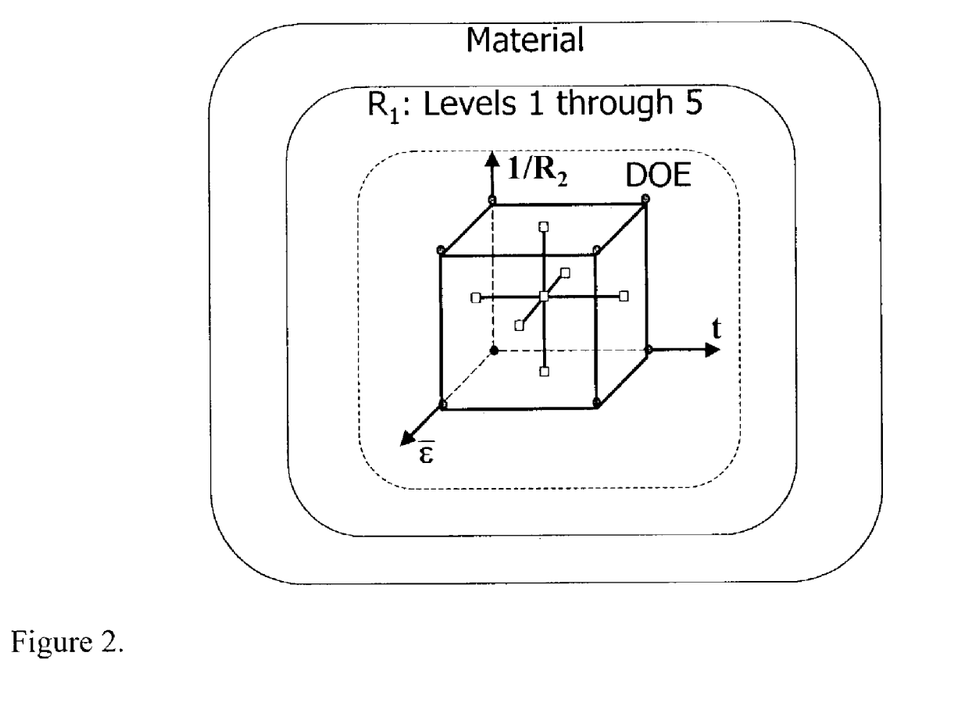
FIG. 2 is a schematic diagram of the arrangement of the variables for the DOE technique to simulate dent resistance.

In this approach generic door 10 is approximated by a simple barrel geometry 12 with two curvatures ($R_1$, $R_2$) as shown in FIG. 1, with the end goal being to develop a simple predictive tool that could be used to evaluate dent resistance of outer panels. The variables that influence panel dent resistance include as follows:

Feature lines (14)
End restraint conditions or support constraints (i.e. side beam 16)
Panel curvature
Thickness
Steel grade
Strain imparted during stamping
Barrel size By conducting systematic investigations, it was found that the most important variables influencing dent resistance were panel curvature, thickness, stretch and steel grade. Using this information, a DOE approach was used. A schematic diagram of the arrangement of the variables for the DOE is shown in FIG. 2. A central composite design was chosen for the DOE with variables $1/R_2$, strain imparted during forming ($\bar{\epsilon}$), and thickness. Three levels were selected for each variable, with seven levels for $R_1$ to allow for more complicated effects. This whole series of virtual experiments were run for the following steel grades: GABH180, BH210, BH250, and DP500.

Two output modules were developed. In the first module, the load to cause a dent of 0.1 mm depth is the output. In the second module, the dent depth at any given applied load is output:

$R_1$ (mm): 150, 250, 500, 750, 1000, 1750, and 2500
$1/R_2$ ($\times 10^{-5}$ mM$^{-1}$): 0.666, 3.666, and 6.666
thickness: 0.65 mm, 0.725 mm and 0.8 mm
strain ($\bar{\epsilon}$): 0.5%, 2.25%, and 4%

Regression analysis was then applied to the results and the equations programmed into Microsoft Excel. Table 1 shows the programmed spreadsheet with important panel variables as input and dent resistance (load to cause a dent of 0.1 mm depth) of the panel as the output.

TABLE 1

| Factor | Value | Units | Description of Variables |
|---|---|---|---|
| Regression Model Input | | | |
| $R_1$ | 840 | mm | $R_1$: Top to Bottom Radius of Curvature |
| Effective stretch | 0.0163 | none | Effective stretch is a calculated value |
| Major strain | 0.75 | % | |
| Minor strain | 0.75 | % | |
| thickness | 0.7 | mm | |
| $R_2$ | 57072 | mm | $R_2$: Front to Back Radius of Curvature |
| Regression Model Output | | | |
| 0.1 mm Dent Load (N) | 142.5 | | |
| | 0 | | |
| (lbf.) | 32.04 | | |

Table 2 shows the input parameters (R1 and R2) for all 8 locations in the Design Guidelines model:

TABLE 2

| Location | $R_1$ (mm) | $R_2$ (mm) |
|---|---|---|
| 1–7 | 1580 | 57072 |
| 8 | 840 | 57072 |

An exemplary Dent Resistance Model ("DRM") expressed by a regression equation is given in Table 3:

TABLE 3

| Term | Coefficients ($A_i$) | Components of Regression ($B_i$) |
|---|---|---|
| Constant | −89.72747602 | −89.72747602 |
| t | 321.9228161 | 270.4151655 |
| e | −2134.220986 | −46.36714819 |
| $1/R_1$ | 100620.9065 | 94.21433197 |
| $e^2$ | −15196.55104 | −7.172772092 |
| $e*t$ | 5299.914629 | 96.72063952 |
| $(1/R_1)^2$ | −79624002.62 | −69.80740596 |
| $(1/R_1)^3$ | 9702869345 | 7.965011833 |
| $1/R_2$ | −41589.47327 | −2.363306812 |
| $(1/R_2)^2$ | −58826396.64 | −0.189952765 |
| $(1/R_1)*e$ | 2886557.415 | 58.71917524 |
| $(1/R_1)^2*e$ | −422606153.2 | −8.049414841 |
| $(1/R_1)*e*t$ | −2865019.408 | −48.95607607 |

TABLE 3-continued

| Factor | Value | Units | Description of Variables |
|---|---|---|---|
| $(1/R_1)*t$ | −146536.3708 | | −115.2533253 |
| $(1/R_1)^2*t$ | 78075066.79 | | 57.49752425 |
| | Sum | | 197.64 |
| Regression Model Input | | | |
| $R_1$ | 1068 | mm | $R_1$: Top to Bottom Radius of Curvature |
| Effective stretch | 0.0217 | none | Effective stretch is a calculated value |
| Major strain | 1 | % | |
| Minor strain | 1 | % | |
| thickness | 0.84 | mm | |
| $R_2$ | 17598 | mm | $R_2$: Front to Back Radius of Curvature |
| Regression Model Output | | | |
| 0.1 mm Dent | 197.6 | | |
| Load (N) | 4 | | |
| (lbf.) | 44.43 | | |

Where the load to cause a dent of depth 0.1 mm, D(0.1), is given by:

$$D(0.1)=A_1+A_2*t+A_3*e+A_4*(1/R_1)+A_5*e^2+A_6*e*t+A_7*(1/R_1)^2+A_8*(1/R_1)^3+A_9*(1/R_2)+A_{10}*(1/R_2)^2+A_{11}(1/R_1)*e+A_{12}*(1/R_1)^2*e+A_{13}*(1/R_1)*e*t+A_{14}*(1/R_1)*t+A_{15}*(1/R_1)^2*t$$

This may be generalized to a regression equation of the form:

$$D(d) = \sum_{i=1}^{N} (A_i + A_i' \times d)(1/R_1)^j (1/R_2)^k e^l t^m$$

where D(d) is the load to cause a dent of depth, d mm, i is the term number, N is the total number of terms not exceeding 25, $A_i$ and $A_i'$ are coefficients in each term for any given material, and the exponents j, k, l, and m are nonnegative integers characteristic of each term that satisfy the constraints:

$0 \leq j \leq 3$ $0 \leq k \leq 2$ $0 \leq l \leq 2$ $0 \leq m \leq 2$ $0 \leq j+k+l+m \leq 3$ and wherein one term shall be a load-dependent term in which j, k, l, and m are all zero, and other terms used for any given material shall be determined from statistical analysis of the results of the statistically designed FEM runs described above for that material.

Similar spreadsheets exist for GA180BH, BH250 and DP500. The next section presents comparisons between the two predictive approaches and physical testing for one front door.

Case Study: Front Door

The present invention presents results from case studies, where the dent resistance as determined by physical testing, Design Guidelines are compared with each other for several doors.

Five doors each of 4 materials (0.7 mm BH210, 0.7 mm BH250, 0.7 mm DP500, and 0.65 mm DP500) were stamped, assembled and painted for dent testing. Dent testing was carried out according to the A/SP Guideline.

For the Design Guidelines approach, information on the radii of curvature was obtained from CAD files of transverse and longitudinal sections of the door. Since no measurements of the strain were taken at the denting location, after discussions with automobile manufacturing customers, a nominal stretch of 0.75%×0.75% was assumed for all locations. Table 2 shows the input parameters for all 8 locations in the Design Guidelines model.

Figure 5:
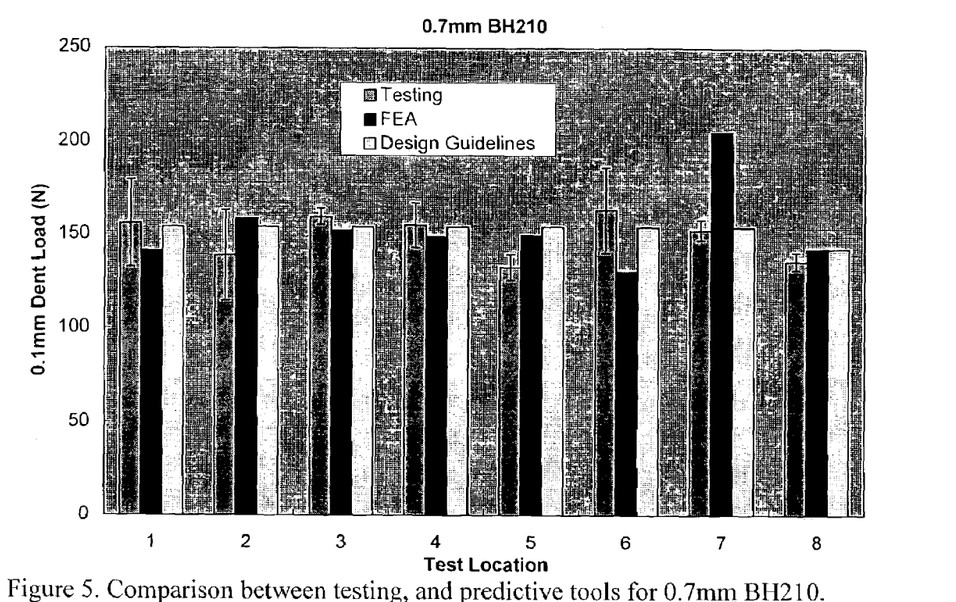
FIGS. 5–7 show the comparison between the testing, FEA of Full Panel and the Design Guidelines for Dent Resistance model. On all these plots, the y-axis shows the 0.1 mm dent load and the x-axis shows the locations.
Figure 6:
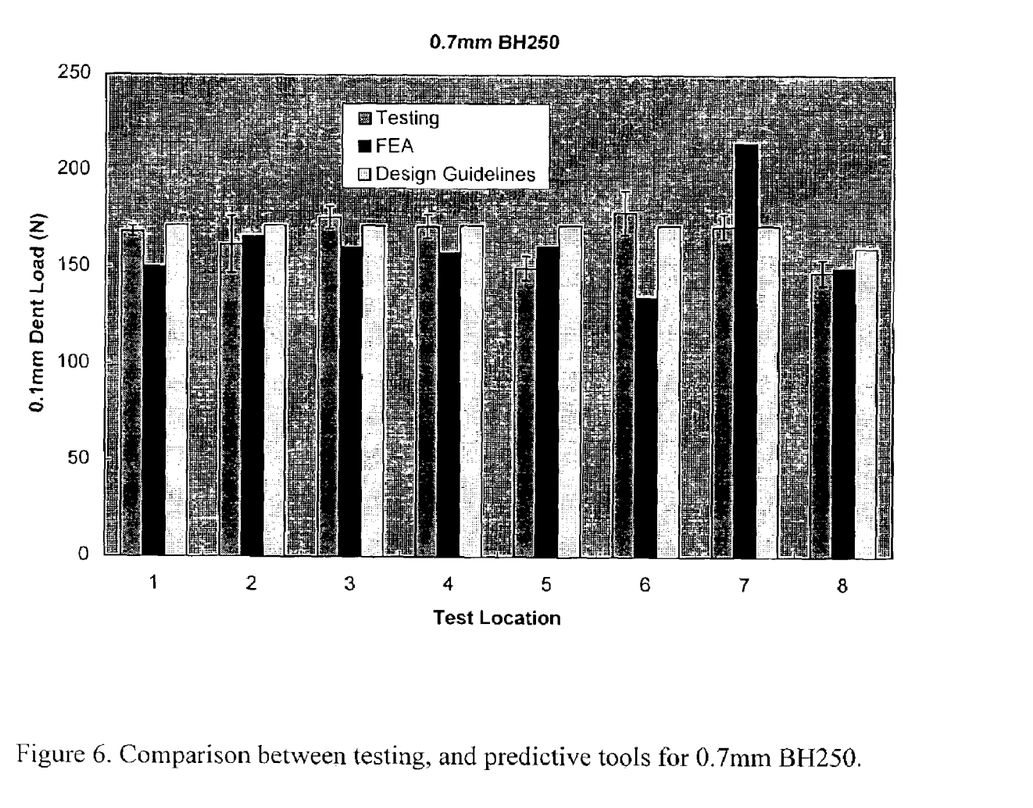
Figure 7:
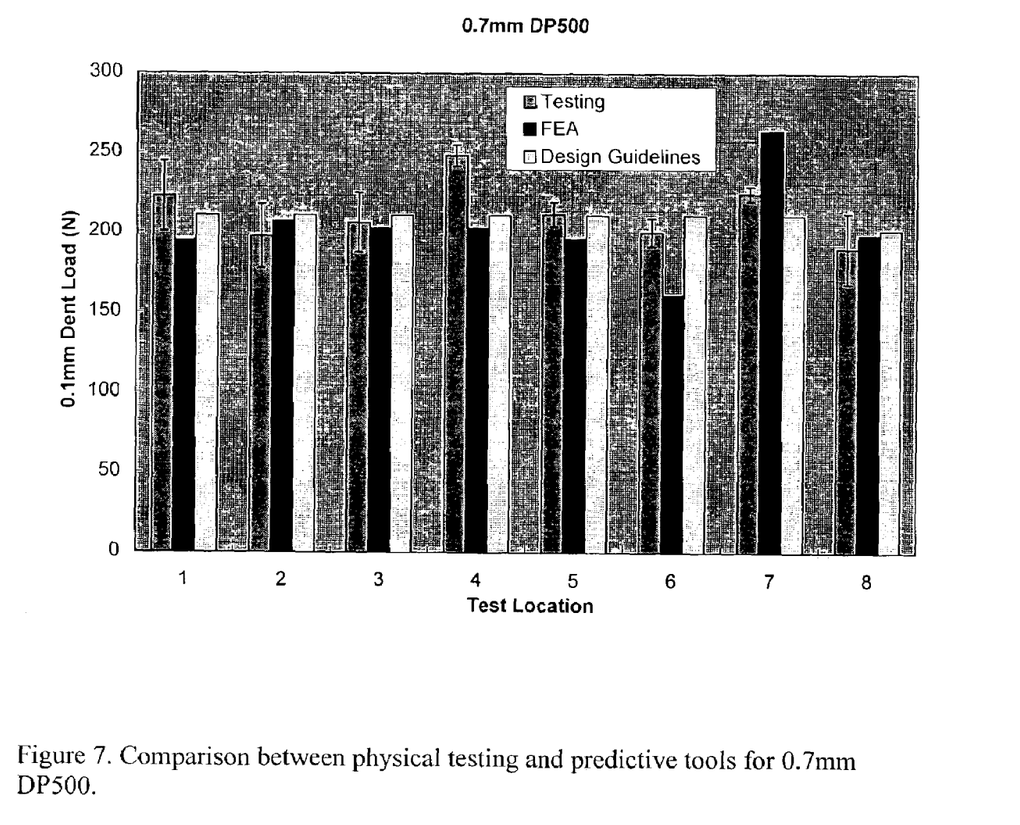

As seen in the FIGS. 5–7, the comparison between the predictive tools and test results is quite good. The above case study demonstrates the validity and advantages of denting FEA and the power of this type of analysis early on in the design process. If used well, the system of tools developed by the present invention has the potential to be instrumental in saving significant design iteration costs for automobile manufacturers.

Figure 3:
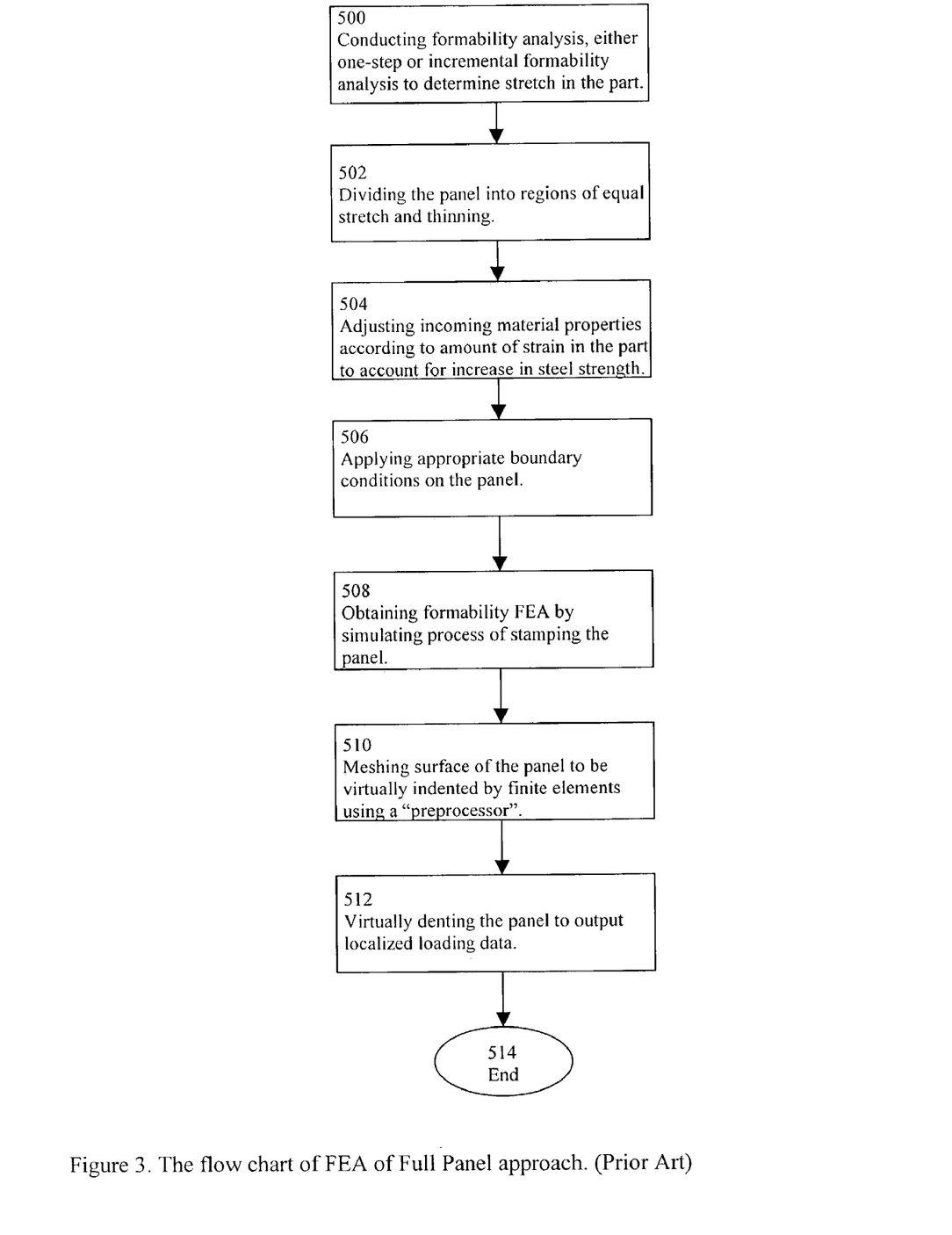
FIG. 3 shows a flow chart of FEA of Full Panel approach.

FIG. 3 shows the flow chart of FEA of Full Panel Approach. First, at step 500, a formability FEA analysis (one-step or incremental) is conducted. Then at step 502, the panel is divided into regions of equal or substantially equal stretch and thinning (termed "nodes"). At step 504, incoming materials properties are adjusted according to amount of strain in the part to account for increase in steel strength. At step 506, appropriate panel boundary conditions are applied. At step 508, formability FEA is obtained by simulating process of stamping the panel. At step 510, the surface of the panel is meshed and virtually indented by finite elements using a "preprocessor." Finally, at step 512, the panel is virtually dented to output localized loading data.

Figure 4:
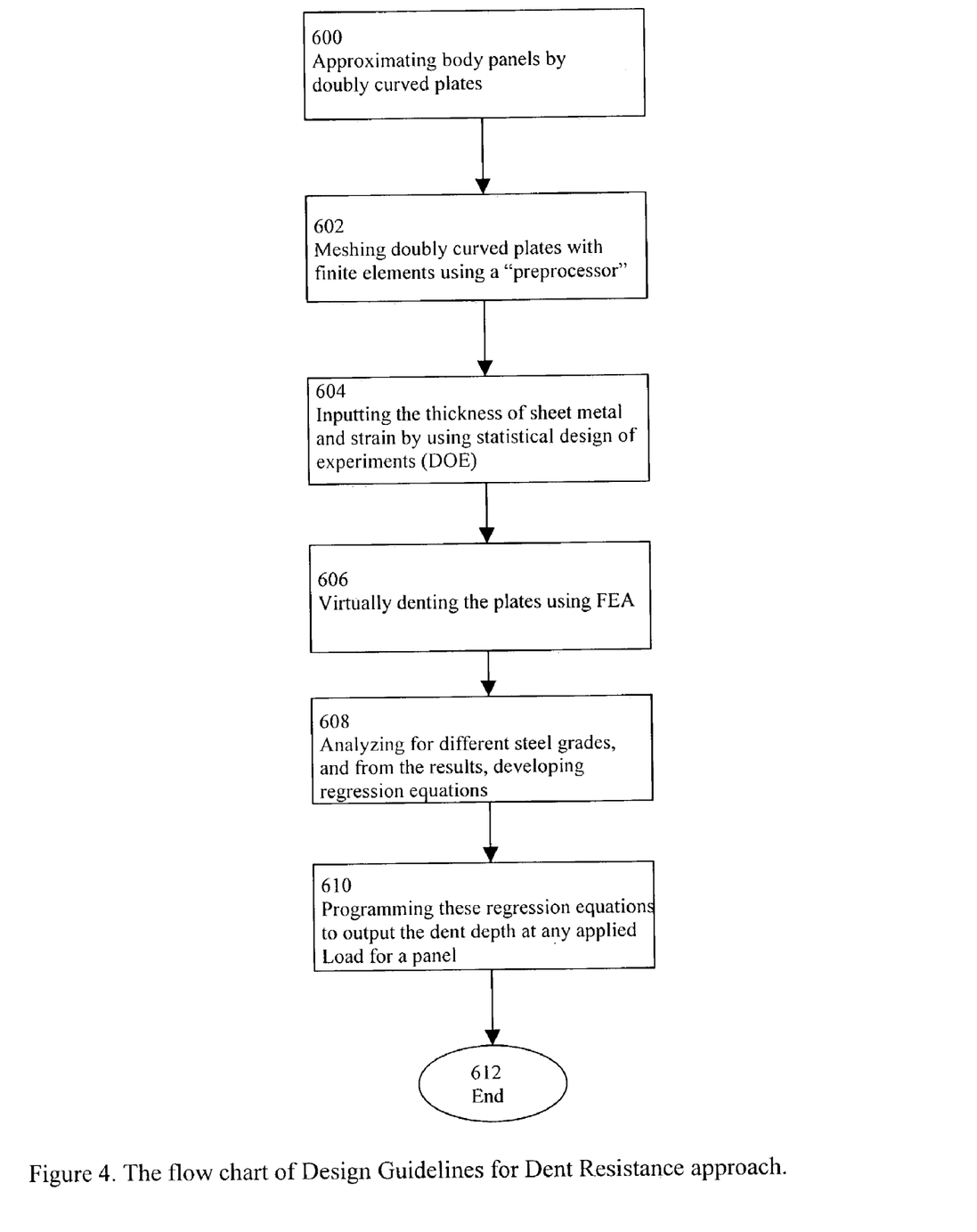
FIG. 4 shows a flow chart of Design Guidelines for Dent Resistance approach.

FIG. 4 shows the flow chart of Design Guidelines Approach using the present invention. At step 600, body panels are approximated by doubly curved plates. At step 602, curved plates are meshed with finite elements using a "preprocessor." At step 604, the thickness of sheet metal and strain are inputted by using statistical design of experiments ("DOE"). At step 606, the plates are virtually dented using FEA. At step 608, regression equations are developed by using the results of analyzing different steel grades. At step 610, the regression equations are programmed to output the dent depth at any applied load for a panel.

In conclusion, the present invention provides a method and apparatus that can predict sheet metal panel dent resistance performance by a simulated process by utilizing Finite Element Analysis methodology. Further, the present invention takes into consideration the effects of panel geometry, panel thickness, mechanical behavior of the material, forming process and loading condition, thus making the prediction of sheet metal panel dent resistance closely resemble a denting process in real world.

While this invention has been described as having an exemplary design, the present invention may be further modified within the spirit and scope of this disclosure. For instance, although not designed for plastic vehicle panels, such inventive concept may be utilized to calculate dent resistance of plastic materials on vehicles by using a similar process with different inputs and regression analysis by utilizing FEA. This application is therefore intended to cover any variations, uses, or adaptations of the invention using its general principles, such as utilizing linear Finite Element Analysis and dynamic impact analysis. Further, this application is intended to cover such departures from the present disclosure as come within known or customary practice in the art to which this invention pertains.

What is claimed is:

1. A method of finite element analysis ("FEA") of design guidelines for dent resistance for determining at least one performance parameter of a sheet material panel under localized loading conditions, the sheet material panel having a defined geometry, said method comprising:

approximating the defined geometry of the sheet material panel implementing at least one curved plate;

creating an FEA model of a localized loading process applied to the at least one curved plate;

inputting curved plate variables that influence the sheet material panel dent resistance, the variables including at least a curvature value;

performing virtual experiments on the at least one curved plate based on the input curved plate variables and the FEA model of the localized loading process; and developing a regression model from virtual experiment results, wherein the regression model outputs the sheet material panel performance parameter under localized loading conditions.

2. The method of claim 1, wherein the sheet material panel performance parameter output by the regression model comprises a localized load required to cause a selected dent.

3. The method of claim 1, wherein the sheet material panel performance parameter output by the regression model comprises a dent depth resulting from a selected applied load.

4. The method of claim 1, further comprising inputting multiple values for each curved plate variable, the curved plate variables comprising at least one of radius of curvature, thickness, and material grade.

5. The method of claim 1, wherein creating an FEA model comprises:

determining a plurality of nodes of the panel geometry;

developing a plurality of equations modeling the sheet material panel behavior at said plurality of nodes; and combining said plurality of equations to provide a finite element analysis model of the characteristics of the sheet material panel having the defined geometry.

6. The method of claim 1, further comprising approximating the sheet material panel by doubly curved plates, the plates each having curvatures $R_1$ and $R_2$ wherein $R_1$ is top to bottom radius and $R_2$ is front to back radius of the curvatures.

7. The method of claim 1, further comprising using the design of experiments approach to input sheet material panel thickness data and sheet material panel strain data.

8. The method of claim 1, further comprising determining denting by using finite element modeling of quasi-static denting approach.

9. The method of claim 1 wherein said regression model includes a regression equation of the form:

$$D(0.1) = \sum_{i=1}^{N} A_i (1/R_1)^j (1/R_2)^k e^l t^m$$

where D(0.1) is the load to cause a dent of depth 0.1 mm, i is the term number, N is the total number of terms not exceeding 25, $A_i$ is a coefficient in each term for any given material, and the exponents j, k, l, and m are nonnegative integers characteristic of each term that satisfy the constraints:

$0 \leq j \leq 3$ $0 \leq k \leq 2$ $0 \leq l \leq 2$ $0 \leq m \leq 2$ $0 \leq j+k+l+m \leq 3$ and wherein one term shall be a constant term in which j, k, l, and m are all zero, and other terms used for any given material shall be determined from statistical analysis of the results of the statistically designed FEA runs described above for that material.

10. The method of claim 1, wherein said input curved plate variables include at least one of panel feature line, panel end restraint conditions, strain imparted during stamping, and barrel size.

11. An apparatus for performing finite element analysis ("FEA") of design guidelines for dent resistance for determining at least one performance parameter of a sheet material panel under localized loading conditions, the sheet material panel having a defined geometry, said apparatus comprising:

means for approximating the defined geometry of the sheet material panel implementing at least one curved plate;

means for creating an FEA model of a localized loading process applied to the at least one curved plate;

means for inputting curved plate variables that influence the sheet material panel dent resistance, the curved plate variables including at least a curvature value;

means for performing virtual experiments on the at least one curved plate based on the input curved plate variables and the FEA model of the localized loading process; and means for developing a regression model from virtual experiment results, wherein the regression model outputs the sheet material panel performance parameter under localized loading conditions.

12. The apparatus of claim 11, wherein the sheet material panel performance parameter output by the regression model comprises a localized load required to cause a selected dent.

13. The apparatus of claim 11, wherein the sheet material panel performance parameter output by the regression model comprises a dent depth resulting from a selected applied load.

14. The apparatus of claim 11, further comprising means for inputting multiple values for each curved plate variable, the curved plate variables comprising at least one of radius of curvature, thickness, and material grade.

15. The apparatus of claim 11, wherein the means for creating an FEA model comprises:

means for determining a plurality of nodes of the panel geometry;

means for developing a plurality of equations modeling the sheet material panel behavior at said plurality of nodes; and means for combining said plurality of equations to provide a finite element analysis model of the characteristics of the sheet material panel having the defined geometry.

16. The apparatus of claim 11, further comprising means for approximating the sheet material panel by doubly curved plates, the plates each having curvatures $R_1$ and $R_2$ wherein $R_1$ is top to bottom radius and $R_2$ is front to back radius of the curvatures.

17. The apparatus of claim 11, further comprising means for using a design of experiments approach to input sheet material panel thickness data and sheet material panel strain data.

18. The apparatus of claim 11, further comprising means for determining denting by using finite element modeling of quasi-static denting approach.

19. The apparatus of claim 11, wherein said regression analysis is performed using a regression equation of the form:

$$D(d) = \sum_{i=1}^{N} (A_i + A_i' \times d)(1/R_1)^j (1/R_2)^k e^l t^m$$

where $D(d)$ is the load to cause a dent of depth, d mm, i is the term number, N is the total number of terms not exceeding 25, $A_i$ and $A_i'$ are coefficients in each term for any given material, and the exponents j, k, l, and m are nonnegative integers characteristic of each term that satisfy the constraints:

$$0 \leq j \leq 3$$
$$0 \leq k \leq 2$$
$$0 \leq l \leq 2$$
$$0 \leq m \leq 2$$
$$0 \leq j+k+l+m \leq 3$$

and wherein one term shall be a load-dependent term in which j, k, l, and m are all zero, and other terms used for any given material shall be determined from statistical analysis of the results of the statistically designed FEM runs described above for that material.

20. The apparatus of claim 11, wherein said input variables include at least one of panel feature line, panel end restraint conditions, strain imparted during stamping, and barrel size.

* * * * *